United States Patent
Kim et al.

(10) Patent No.: US 10,353,758 B2
(45) Date of Patent: Jul. 16, 2019

(54) DATA CODING METHODS FOR A COMMUNICATION BETWEEN SEMICONDUCTOR CHIPS

(71) Applicant: SAMSUNG ELECTRONICS CO., LTD., Suwon-si, Gyeonggi-do (KR)

(72) Inventors: Eung Sup Kim, Suwon-si (KR); Seongyoon Kim, Bucheon-si (KR); Sangheon Lee, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 196 days.

(21) Appl. No.: 15/442,968

(22) Filed: Feb. 27, 2017

(65) Prior Publication Data
US 2017/0272202 A1 Sep. 21, 2017

(30) Foreign Application Priority Data

Mar. 18, 2016 (KR) .................. 10-2016-0033050
Jul. 5, 2016 (KR) .................. 10-2016-0084867

(51) Int. Cl.
*H04L 1/00* (2006.01)
*G06F 11/00* (2006.01)
*G06F 15/16* (2006.01)

(52) U.S. Cl.
CPC .............. *G06F 11/00* (2013.01); *G06F 15/16* (2013.01)

(58) Field of Classification Search
CPC ... G09G 5/222; H04L 1/0009; H04L 1/00029; H04L 63/105; H03M 7/40; H03M 7/4006; H03M 7/6088; H04W 12/08; H04W 4/18; G11C 15/04; G11B 20/1426
See application file for complete search history.

(56) References Cited

U.S. PATENT DOCUMENTS

| | | | |
|---|---|---|---|
| 6,539,166 B2 | 3/2003 | Kawamura et al. | |
| 6,952,405 B2 | 10/2005 | Tsang et al. | |
| 7,055,073 B2 | 5/2006 | Walker et al. | |
| 7,302,631 B2 | 11/2007 | Bansal | |
| 7,487,426 B2 | 2/2009 | Hoyer | |
| 7,689,047 B2 * | 3/2010 | Bahar | H04N 19/60 382/232 |
| 8,230,120 B2 | 7/2012 | Ajanovic et al. | |

(Continued)

*Primary Examiner* — Phung M Chung
(74) *Attorney, Agent, or Firm* — Volentine, Whitt & Francos, PLLC

(57) ABSTRACT

In a data encoding method for a communication between semiconductor chips, a data sequence is received. The data sequence includes multiple characters and multiple identification codes coupled to the characters, respectively. The data sequence is stored in a buffer in a unit of a predetermined number of pairs of characters and identification codes. Whether at least one control character is stored in the buffer is determined based on the identification codes stored in the buffer. When at least one control character is stored in the buffer, the at least one control character is converted to at least one internal control character, respectively. When multiple control characters are stored in the buffer, at least one internal control character includes a reference number representing a location of a sequentially next control character in the buffer. A first type data block is generated. The first type data block includes data characters stored in the buffer and the at least one internal control character.

20 Claims, 15 Drawing Sheets

(56) References Cited

U.S. PATENT DOCUMENTS

| | | | |
|---|---|---|---|
| 8,345,750 B2 * | 1/2013 | Lee | H04N 19/107 |
| | | | 375/240.08 |
| 8,548,048 B2 * | 10/2013 | El-Maleh | H04N 21/23406 |
| | | | 375/240.05 |
| 8,552,890 B2 * | 10/2013 | Kim | H03M 7/4018 |
| | | | 341/51 |
| 8,581,753 B2 * | 11/2013 | Kim | H03M 7/4018 |
| | | | 341/107 |
| 8,898,550 B2 | 11/2014 | Cideciyan | |
| 9,054,894 B2 | 6/2015 | Kobayashi et al. | |
| 9,166,618 B2 | 10/2015 | Cideciyan | |
| 2013/0187797 A1 * | 7/2013 | Kim | H03M 7/4018 |
| | | | 341/51 |
| 2013/0188734 A1 * | 7/2013 | Kim | H03M 7/4018 |
| | | | 375/240.25 |
| 2015/0127942 A1 * | 5/2015 | Lee | G06F 21/602 |
| | | | 713/168 |

* cited by examiner

DATA CODING METHODS FOR A COMMUNICATION BETWEEN SEMICONDUCTOR CHIPS

CROSS-REFERENCE TO RELATED APPLICATION(S)

This U.S. non-provisional patent application claims priority under 35 USC § 119 to Korean Patent Application No. 10-2016-0033050, filed on Mar. 18, 2016, and Korean Patent Application No. 10-2016-0084867, filed on Jul. 5, 2016, in the Korean Intellectual Property Office (KIPO), the contents of which are herein incorporated by reference in their entirety.

BACKGROUND

1. Technical Field

Example embodiments of the present disclosure relate to a data coding method, and more particularly to a data coding method for a communication between semiconductor chips.

2. Description of the Related Art

Generally, according to a communication protocol between semiconductor chips, data is communicated between semiconductor chips after an identification code is attached to the corresponding character. The identification code represents whether a corresponding character is a data character or a control character.

Therefore, the identification code attached to the character is considered as a communication overhead.

As described above, since a portion of a bandwidth of a communication channel between semiconductor chips is used by the identification code attached to the character, an effective bandwidth of the communication channel between the semiconductor chips is decreased.

SUMMARY

Some example embodiments of the present disclosure are directed to providing a data encoding method that increases an effective channel bandwidth between semiconductor chips by decreasing a communication overhead.

Some example embodiments of the present disclosure are directed to providing a data decoding method that increases an effective channel bandwidth between semiconductor chips by decreasing a communication overhead.

In a data encoding method for a communication between semiconductor chips, a data sequence is received. The data sequence includes multiple characters and multiple identification codes coupled to the multiple characters, respectively. Each of the multiple identification codes represents whether a corresponding character is a data character or a control character. The data sequence is stored in a buffer in a unit of a predetermined number of pairs of characters and identification codes. Whether at least one control character is stored in the buffer is determined based on the identification codes stored in the buffer. When at least one control character is stored in the buffer, the at least one control character is converted to at least one internal control character, respectively. When multiple control characters are stored in the buffer, at least one of the internal control characters corresponding to the multiple control characters includes a reference number representing a location of a sequentially next control character in the buffer. A first type data block including data characters stored in the buffer and the at least one internal control character is generated. The at least one internal control character stored in the data block corresponds to the at least one control character stored in the buffer.

In a data decoding method for a communication between semiconductor chips, a data block is received. The data block includes a block type code and a predetermined number of characters. Whether the data block is a first type data block or a second type data block is determined based on the block type code. When the data block is the first type data block, a process is performed that includes storing a first character of the first type data block in a buffer. A reference number and a termination flag are initially included in the first character stored in the buffer. The process includes determining whether each of the predetermined number of characters included in the first type data block is a data character or an internal control character based on the reference number and the termination flag. The process also includes determining an order of outputting the predetermined number of characters included in the first type data block based on the reference number and the termination flag. When outputting the data character, an identification code having a first value and the data character are output consecutively. When outputting the internal control character, a control character is generated by converting a mapping code included in the internal control character. The identification code having a second value and the control character are output consecutively.

According to example embodiments, an encoding device includes a buffer and an encoding engine. The encoding engine receives a data sequence including multiple characters and multiple identification codes coupled to the multiple characters, respectively. Each of the multiple identification codes represents whether a corresponding character is a data character or a control character. The encoding engine stores the data sequence in the buffer in a unit of a predetermined number of pairs of characters and identification codes. The encoding engine determines whether at least one control character is stored in the buffer based on the identification codes stored in the buffer. When at least one control character is stored in the buffer, the encoding engine converts the at least one control character to at least one internal control character, respectively. When multiple control characters are stored in the buffer, at least one of the internal control characters includes a reference number representing a location of a sequentially next control character in the buffer. The encoding engine generates a first type data block including data characters stored in the buffer and the at least one internal control character. The at least one internal control character stored in the first type data block corresponds to the at least one control character stored in the buffer.

BRIEF DESCRIPTION OF THE DRAWINGS

Illustrative, non-limiting example embodiments of the present disclosure will be more clearly understood from the following detailed description in conjunction with the accompanying drawings.

DETAILED DESCRIPTION OF THE EMBODIMENTS

Figure 1:
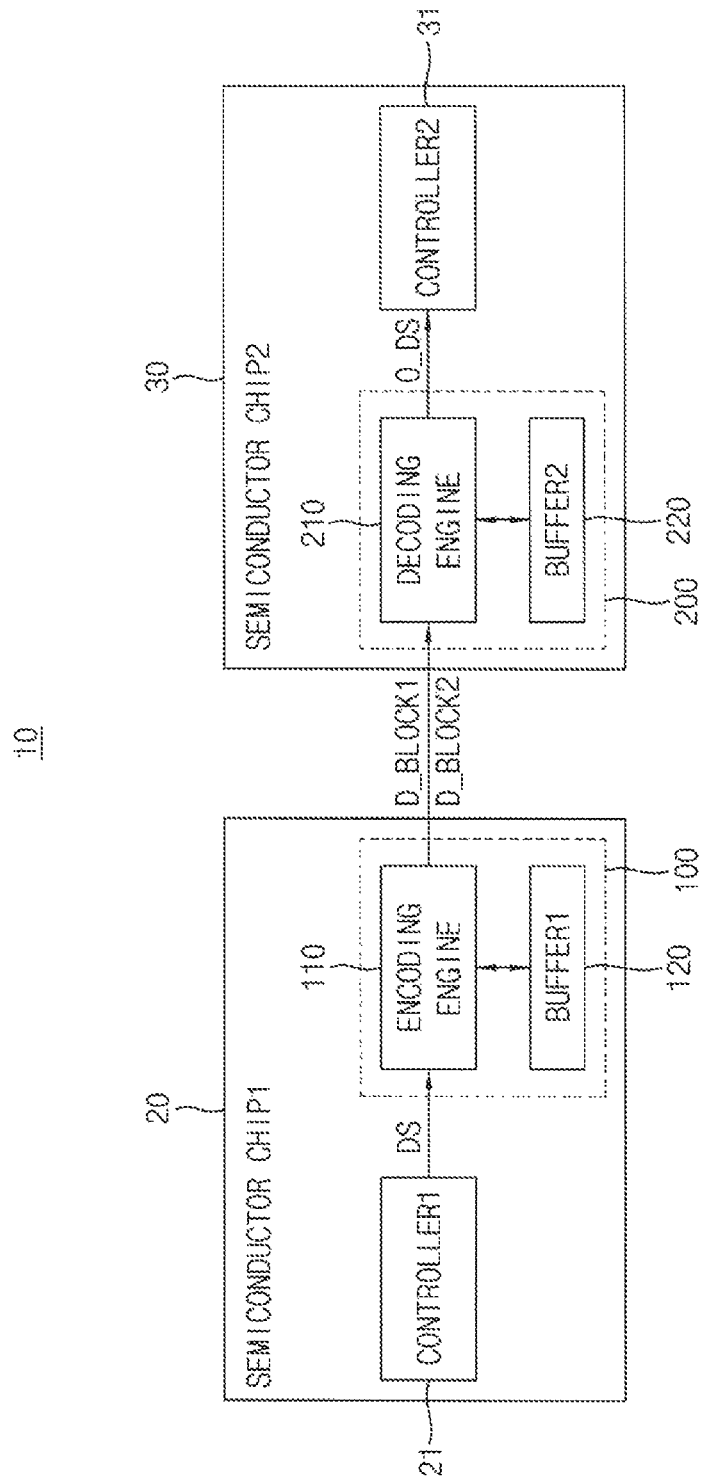
FIG. 1 is a block diagram illustrating an electronic device according to example embodiments.

FIG. 1 is a block diagram illustrating an electronic device according to example embodiments.

Referring to FIG. 1, an electronic device 10 includes a first semiconductor chip 20 and a second semiconductor chip 30.

The first semiconductor chip 20 may include a first controller 21 and an encoding device 100. The second semiconductor chip 30 may include a second controller 31 and a decoding device 200.

The first controller 21 included in the first semiconductor chip 20 may generate a data sequence DS by packetizing data, which are to be transmitted to the second semiconductor chip 30.

In some example embodiments, the first controller 21 may generate the data sequence DS based on a communication protocol. In the communication protocol, each character is classified into a data character, which represents an actual data, or a control character, which is used for a communication control. For example, the control character may represent a start of a packet, an end of a packet, etc. In this case, the data sequence DS may include multiple characters and multiple identification codes coupled to the multiple characters, respectively. Each of the multiple identification codes may represent whether a corresponding character is a data character or a control character.

For example, the first controller 21 may generate the data sequence DS based on an Unipro protocol, which is defined in a Mobile Industry Processor Interface (MIPI) standard. However, controllers are not limited thereto. According to example embodiments, the first controller 21 may generate the data sequence DS based on any kind of a communication protocol, in which each character is classified into a data character or a control character.

A number of bits of the data character included in the data sequence DS and a number of bits of the control character included in the data sequence DS may be the same.

The first controller 21 may provide the data sequence DS to the encoding device 100.

The encoding device 100 may generate a data block including a predetermined number of characters by encoding the data sequence DS. Therefore, a size of the data block transmitted from the first semiconductor chip 20 to the second semiconductor chip 30 may be fixed.

In some example embodiments, the encoding device 100 may include an encoding engine 110 and a first buffer 120.

The encoding engine 110 may store the data sequence DS in the first buffer 120 in a unit of the predetermined number of pairs of characters and identification codes. For example, the encoding engine 110 may store the predetermined number of consecutive characters included in the data sequence DS and the predetermined number of identification codes coupled to the predetermined number of consecutive characters in the first buffer 120.

Therefore, a size of the first buffer 120 may correspond to a sum of a size of the predetermined number of characters and a size of the predetermined number of identification codes coupled to the predetermined number of characters.

After that, the encoding engine 110 may generate the data block including the predetermined number of characters by encoding the predetermined number of characters stored in the first buffer 120. As will be described later, the predetermined number of identification codes stored in the first buffer 120 may not be included in the data block.

The data block may be classified into a first type data block D_BLOCK1 or a second type data block D_BLOCK2 based on whether the data block includes at least one control character. The encoding engine 110 may insert a block type code having a first value at a front of the first type data block D_BLOCK1. The encoding engine 110 may insert the block type code having a second value at a front of the second type data block D_BLOCK2. Therefore, the data block may be determined as one of the first type data block D_BLOCK1 and the second type data block D_BLOCK2 based on the block type code included in the data block.

A detailed operation of the encoding device 100 will be described later.

The data block generated by the encoding device 100 may be transmitted to the second semiconductor chip 30.

The decoding device 200 included in the second semiconductor chip 30 may receive the data block, and generate an output data sequence O_DS by decoding the data block.

In some example embodiments, the decoding device 200 may include a decoding engine 210 and a second buffer 220.

The decoding engine 210 may determine whether the data block received from the first semiconductor chip 20 is the first type data block D_BLOCK1 or the second type data block D_BLOCK2 based on the block type code included in the data block. In addition, the decoding engine 210 may determine whether each of the predetermined number of characters included in the data block is a data character or a control character using the second buffer 220. The decoding engine 210 may generate the output data sequence O_DS by coupling the identification code having a value corresponding to a data character to each data character included in the data block, and coupling the identification code having a value corresponding to a control character to each control character included in the data block.

Therefore, the output data sequence O_DS generated by the decoding device 200 may be the same as the data sequence DS provided to the encoding device 100.

A detailed operation of the decoding device 200 will be described later.

The output data sequence O_DS generated by the decoding device 200 may be provided to the second controller 31.

As described above, the data block transmitted between the first semiconductor chip 20 and the second semiconductor chip 30 may not include the identification codes, which are included in the data sequence DS. Therefore, an effective bandwidth of a communication channel between the first semiconductor chip 20 and the second semiconductor chip 30 may be increased.

In addition, although the first semiconductor chip 20 and the second semiconductor chip 30 communicate with each other using the encoding device 100 and the decoding device 200 according to example embodiments, the first controller 21 included in the first semiconductor chip 20 and the second controller 31 included in the second semiconductor chip 30 may be implemented with a conventional controller operating based on a standard communication protocol. Therefore, the encoding device 100 and the decoding device 200 according to example embodiments may be easily adopted in semiconductor chips.

Figure 2:
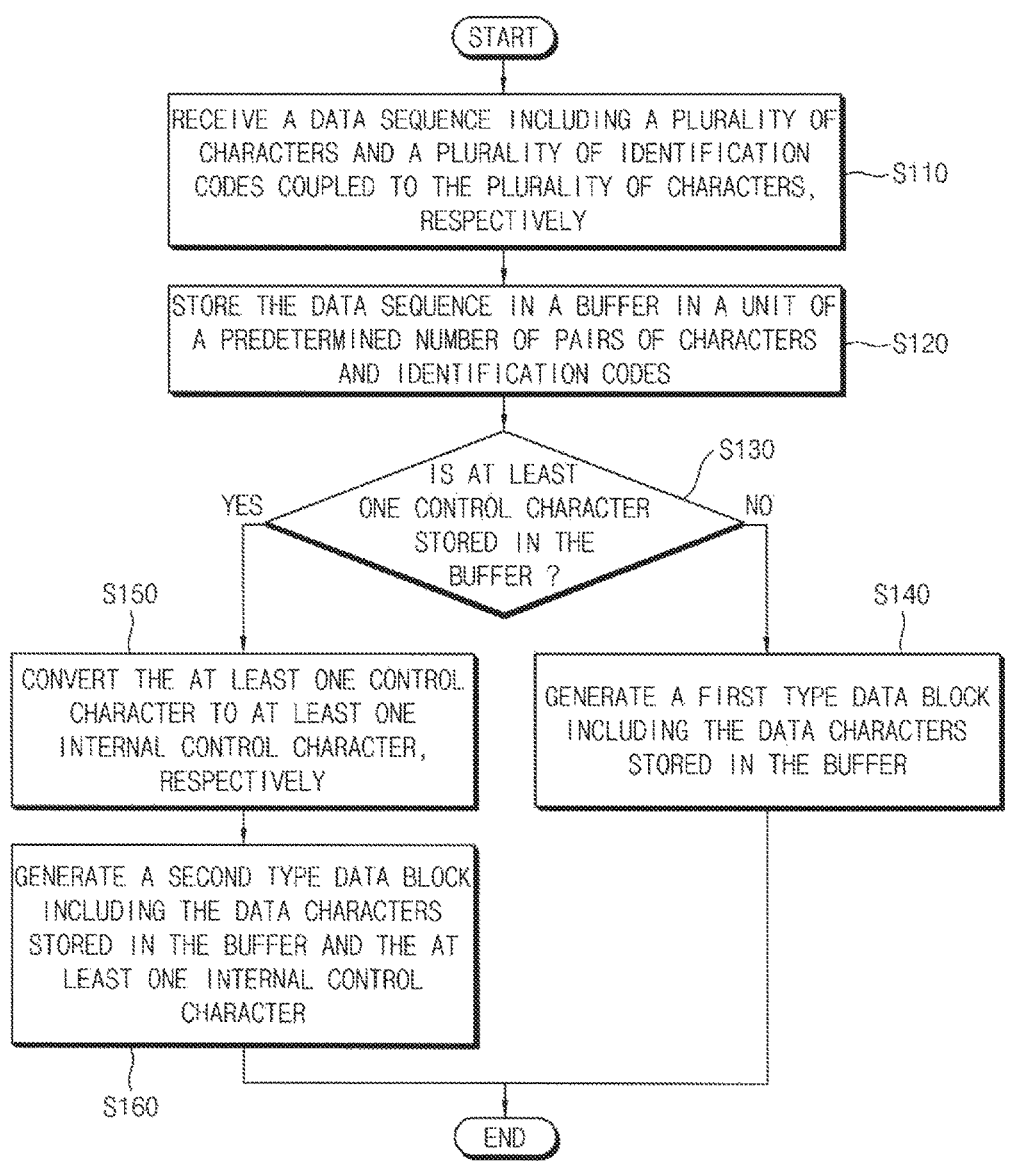
FIG. 2 is a flow chart illustrating a data encoding method for a communication between semiconductor chips according to example embodiments.

FIG. 2 is a flow chart illustrating a data encoding method for a communication between semiconductor chips according to example embodiments.

The data encoding method of FIG. 2 may be performed by the encoding device 100 of FIG. 1.

Hereinafter, a data encoding method performed by the encoding device 100 will be described with reference to FIGS. 1 and 2.

Referring to FIG. 2, the encoding engine 110 may receive the data sequence DS including multiple characters and multiple identification codes coupled to the multiple characters, respectively, from the first controller 21 (step S110). Each of the multiple identification codes coupled to the multiple characters may represent whether a corresponding character is a data character or a control character. As described above, the first controller 21 may generate the data sequence DS based on a communication protocol, in which each character is classified into a data character, which represents an actual data, or a control character, which is used for a communication control.

The encoding engine 110 may store the data sequence DS in the first buffer 120 in a unit of the predetermined number of pairs of characters and identification codes (step S120). For example, the encoding engine 110 may store the predetermined number of consecutive characters included in the data sequence DS and the predetermined number of identification codes coupled to the predetermined number of consecutive characters in the first buffer 120.

Figure 3:
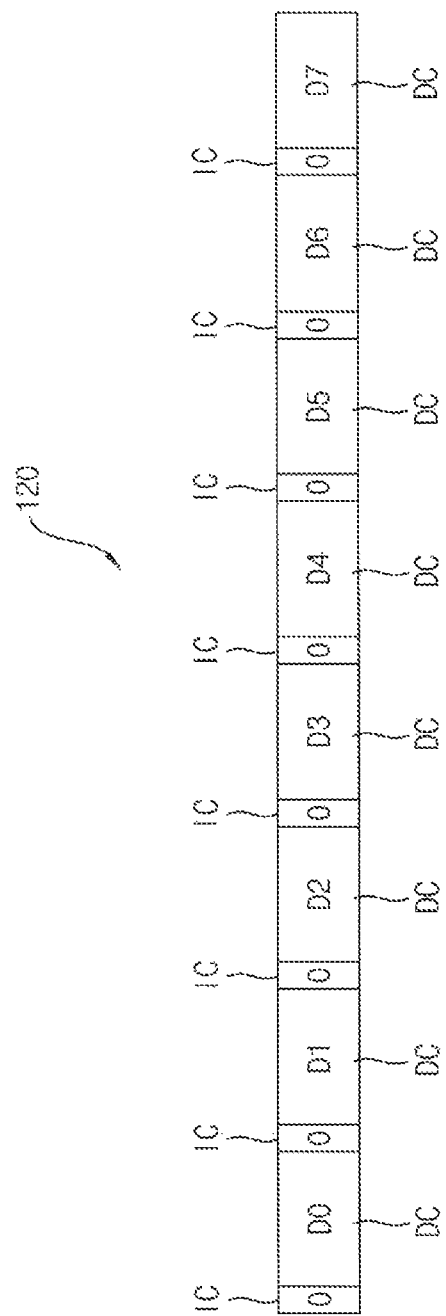
FIGS. 3, 4, and 5 are diagrams illustrating examples of a data sequence stored in a first buffer included in a first semiconductor chip of FIG. 1.
Figure 4:
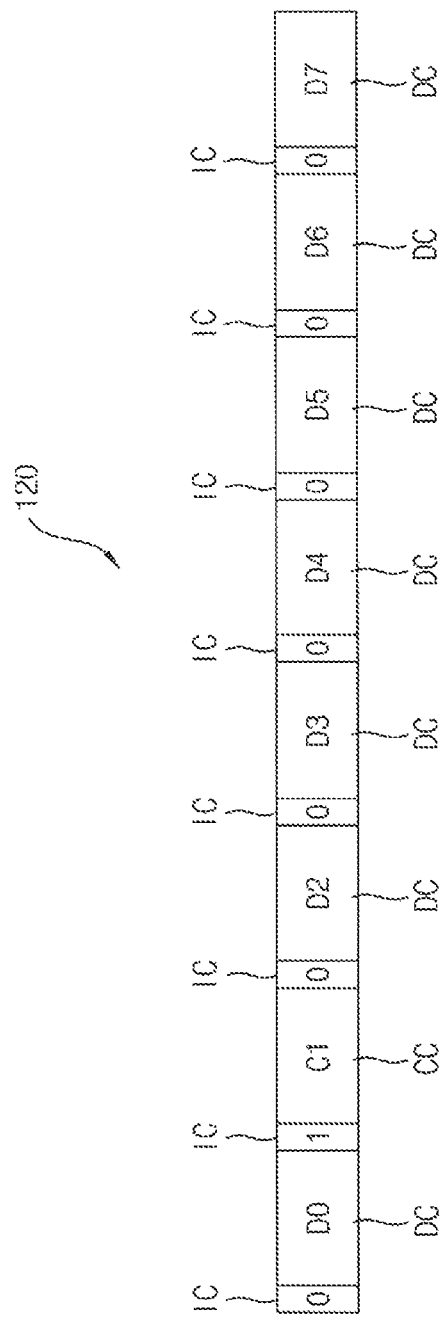
Figure 5:
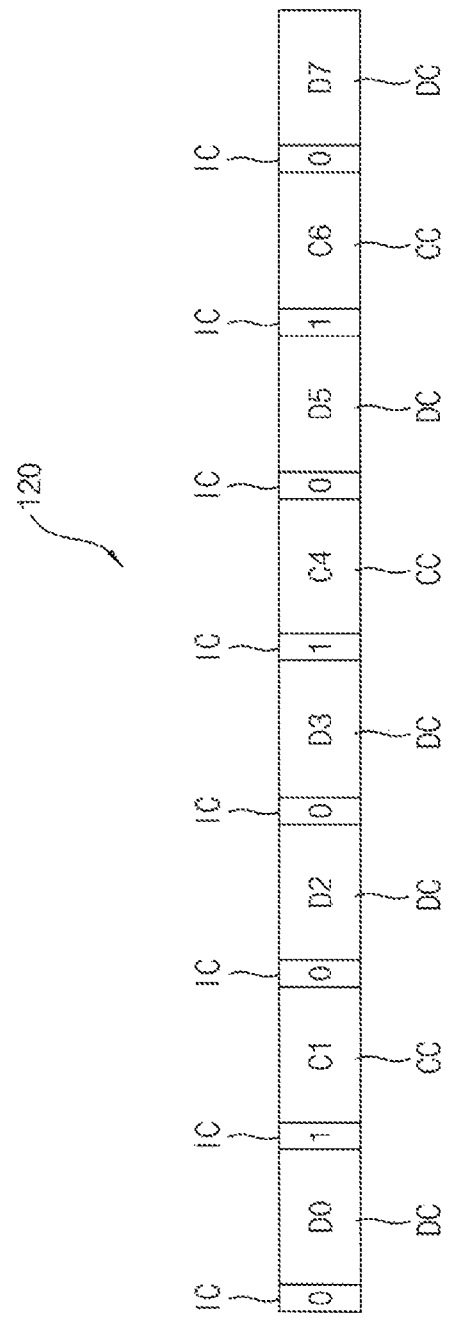

FIGS. 3, 4, and 5 are diagrams illustrating examples of a data sequence stored in a first buffer included in a first semiconductor chip of FIG. 1.

In FIGS. 3, 4, and 5, examples of the data sequence DS stored in the first buffer 120 are represented when the data block generated by the encoding device 100 includes eight characters. In this case, as illustrated in FIGS. 3, 4, and 5, the size of the first buffer 120 may correspond to a sum of a size of eight characters and a size of eight identification codes IC coupled to the eight characters.

In FIGS. 3, 4, and 5, Dx represents a data character DC and Cx represents a control character CC. Here, x represents an integer equal to or greater than zero.

In addition, in FIGS. 3, 4, and 5, the identification code IC includes one bit, the identification code IC coupled to the data character DC is '0', and the identification code IC coupled to the control character CC is '1'.

In FIG. 3, eight data characters DC are stored in the first buffer 120.

In FIG. 4, a second character stored in the first buffer 120 is the control character CC and the other seven characters stored in the first buffer 120 are data characters DC.

In FIG. 5, second, fifth, and seventh characters stored in the first buffer 120 are the control characters CC and the other five characters stored in the first buffer 120 are data characters DC.

Referring again to FIG. 2, after the encoding engine 110 stores the data sequence DS in the first buffer 120 in a unit of the predetermined number of pairs of characters and identification codes (step S120), the encoding engine 110 may determine whether at least one control character CC is stored in the first buffer 120 based on the identification codes IC stored in the first buffer 120 (step S130).

When the control character CC is not stored in the first buffer 120 (step S130; no), the encoding engine 110 may generate the first type data block D_BLOCK1 including the data characters DC stored in the first buffer 120 (step S140).

Figure 6:
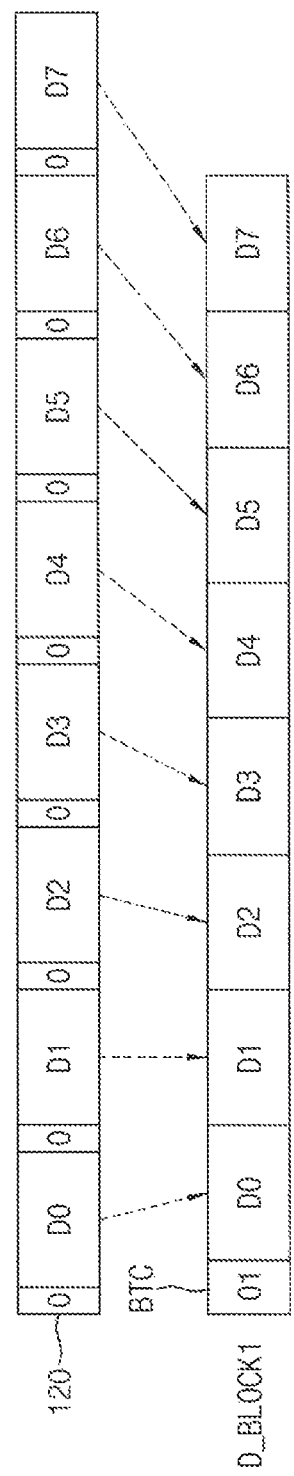
FIG. 6 is a diagram illustrating an example of a first type data block generated by an encoding device included in the first semiconductor chip of FIG. 1 when a control character is not stored in the first buffer.

FIG. 6 is a diagram illustrating an example of a first type data block generated by an encoding device included in the first semiconductor chip of FIG. 1 when a control character is not stored in the first buffer.

As illustrated in FIG. 6, when the control character CC is not stored in the first buffer 120, the encoding engine 110 may generate the first type data block D_BLOCK1. The first type data block D_BLOCK1 may include the block type code BTC having the first value at a front of the first type data block D_BLOCK1. In FIG. 6, the first value corresponds to '01'.

As illustrated in FIG. 6, the encoding engine 110 may generate the first type data block D_BLOCK1 by putting the predetermined number of data characters DC stored in the first buffer 120 after the block type code BTC having the first value while maintaining an order of the predetermined number of data characters DC stored in the first buffer 120.

The encoding engine 110 may omit the identification codes IC stored in the first buffer 120, and put only the data characters DC stored in the first buffer 120 in the first type data block D_BLOCK1.

Therefore, a size of the first type data block D_BLOCK1 may correspond to a sum of a size of the predetermined number of characters and a size of the block type code BTC.

When at least one control character CC is stored in the first buffer 120 (step S130; yes), the encoding engine 110 may convert the at least one control character CC to at least one internal control character, respectively (step S150).

In some example embodiments, a number of bits of the internal control character may be the same as a number of bits of the control character CC. Therefore, a number of bits of the data character DC, a number of bits of the control character CC, and a number of bits of the internal control character may be the same.

Figure 7:
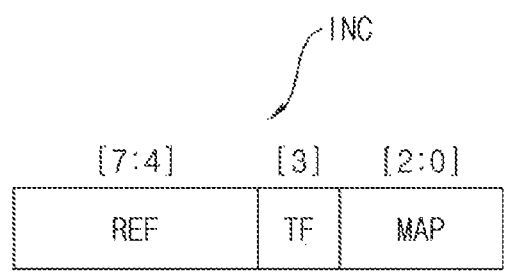
FIG. 7 is a diagram illustrating an example of an internal control character generated by an encoding device included in the first semiconductor chip of FIG. 1.

FIG. 7 is a diagram illustrating an example of an internal control character generated by an encoding device included in the first semiconductor chip of FIG. 1.

In FIG. 7, the internal control character INC is illustrated to include eight bits as an example.

Referring to FIG. 7, the internal control character INC may include a mapping code MAP, a reference number REF, and a termination flag TF.

The mapping code MAP included in the internal control character INC may represent a value of the control character CC corresponding to the internal control character INC.

Although the mapping code MAP is illustrated to include three bits in FIG. 7, mapping codes are not limited thereto. A number of bits of the mapping code MAP may be determined based on a potential number of different values that the control character CC may have in the data sequence DS. For example, when the number of values that the control character CC can have in the data sequence DS is equal to or smaller than eight, the number of bits of the mapping code MAP may be three.

The reference number REF included in the internal control character INC may represent a location of a next control character of the control character CC, which corresponds to the internal control character INC, in the first buffer 120.

When the control character CC corresponding to the internal control character INC is the sequentially last control character among the at least one control character CC stored in the first buffer 120, the reference number REF included in the internal control character INC may represent a location of a sequentially first control character among the at least one control character CC stored in the first buffer 120. The sequentially last control character may be the control character in the last physical and/or logical location in the first buffer 120, or may be the control character placed timewise last in the first buffer 120. The sequentially first control character may be the control character in the first physical and/or logical location in the first buffer 120, or may be the control character placed timewise first in the first buffer 120.

The at least one internal control character INC is generated by converting the at least one control character CC stored in the first buffer 120. Therefore, a combination of the reference numbers REF included in the at least one internal control character INC may correspond to a linked list representing the location of the at least one control character CC in the first buffer 120.

Although the reference number REF is illustrated to include four bits in FIG. 7, reference numbers are not limited thereto. A number of bits of the reference number REF may be determined based on a number of characters included in the second type data block D_BLOCK2. For example, as a frequency of the control characters CC in the data sequence DS is low, the number of bits of the reference number REF may be small.

The termination flag TF included in the internal control character INC may represent whether a control character indicated by the reference number REF of the internal control character INC is a sequentially last control character among the at least one control character CC stored in the first buffer 120.

For example, when a control character indicated by the reference number REF of the internal control character INC is not a sequentially last control character among the at least one control character CC stored in the first buffer 120, the termination flag TF included in the internal control character INC may have a value of '0'. On the other hand, when a control character indicated by the reference number REF of the internal control character INC is a sequentially last control character among the at least one control character CC stored in the first buffer 120, the termination flag TF included in the internal control character INC may have a value of '1'.

The at least one internal control character INC corresponds to the at least one control character CC stored in the first buffer 120. Referring again to FIG. 2, the encoding engine 110 converts the at least one control character CC stored in the first buffer 120 to the at least one internal control character INC, respectively (step S150). Afterwards, the encoding engine 110 may generate the second type data block D_BLOCK2 including the data characters DC stored in the first buffer 120 and the at least one internal control character INC (step S160).

Figure 8:
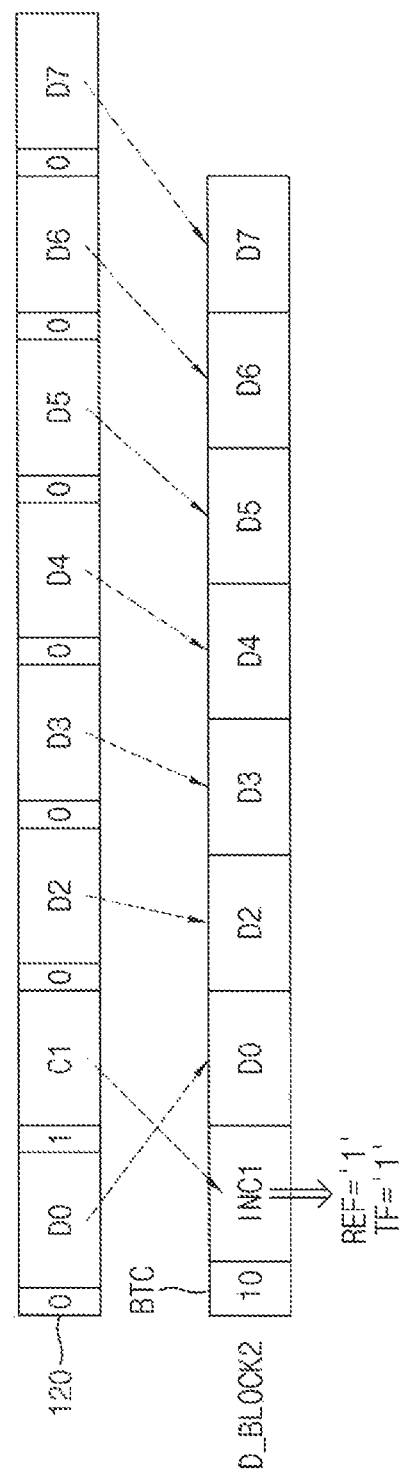
FIG. 8 is a diagram illustrating an example of a second type data block generated by an encoding device included in the first semiconductor chip of FIG. 1 when one control character is stored in the first buffer.

FIG. 8 is a diagram illustrating an example of a second type data block generated by an encoding device included in the first semiconductor chip of FIG. 1 when one control character is stored in the first buffer.

As illustrated in FIG. 8, when one control character CC is stored in the first buffer 120, the encoding engine 110 may generate the second type data block D_BLOCK2. The second type data block D_BLOCK2 may include the block type code BTC having the second value at a front of the second type data block D_BLOCK2. In FIG. 8, the second value corresponds to '10'.

The encoding engine 110 may generate an internal control character INC1 by converting a control character C1 stored in the first buffer 120 according to the process described above with reference to FIG. 7.

The mapping code MAP included in the internal control character INC1 may have a value corresponding to a value of the control character C1.

In addition, since one control character C1 is stored in the first buffer 120, the reference number REF included in the internal control character INC1 may have a value of '1', which represents a location of the one control character C1 in the first buffer 120.

In addition, since the control character C1 indicated by the reference number REF of the internal control character INC1 is a sequentially last control character among the at least one control character CC stored in the first buffer 120, the termination flag TF included in the internal control character INC1 may have a value of '1'.

The internal control character INC1 is generated by converting the one control character C1 stored in the first buffer 120. As illustrated in FIG. 8, when one control character C1 is stored in the first buffer 120, the encoding engine 110 may put the internal control character INC1 in the second type data block D_BLOCK2 as a first character of the second type data block D_BLOCK2.

After that, the encoding engine 110 may generate the second type data block D_BLOCK2 by putting the data characters DC stored in the first buffer 120 after the internal control character INC1 while maintaining an order of the data characters DC stored in the first buffer 120.

The encoding engine 110 may omit the identification codes IC stored in the first buffer 120, and put the internal control character INC1 and the data characters DC stored in the first buffer 120 in the second type data block D_BLOCK2.

Therefore, a size of the second type data block D_BLOCK2 may correspond to a sum of a size of the predetermined number of characters and a size of the block type code BTC.

Figure 9:
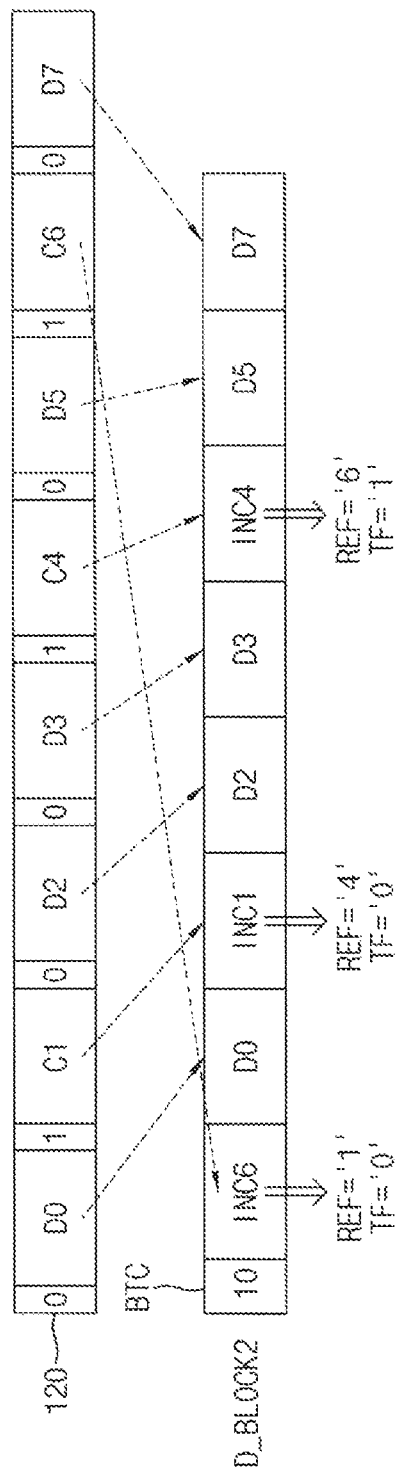
FIG. 9 is a diagram illustrating an example of a second type data block generated by an encoding device included in the first semiconductor chip of FIG. 1 when multiple control characters are stored in the first buffer.

FIG. 9 is a diagram illustrating an example of a second type data block generated by an encoding device included in the first semiconductor chip of FIG. 1 when multiple control characters are stored in the first buffer.

As illustrated in FIG. 9, when multiple control characters C1, C4, and C6 are stored in the first buffer 120, the encoding engine 110 may generate the second type data block D_BLOCK2. The second type data block D_BLOCK2 may include the block type code BTC having the second value at a front of the second type data block D_BLOCK2. In FIG. 9, the second value corresponds to '10'.

The encoding engine 110 may generate multiple internal control characters INC1, INC4, and INC6 by converting each of the multiple control characters C1, C4, and C6 stored in the first buffer 120 according to the process described above with reference to FIG. 7.

The internal control character INC1 is generated by converting the control character C1. The mapping code MAP included in the internal control character INC1 may have a value corresponding to a value of the control character C1.

In addition, the reference number REF included in the internal control character INC1 may have a value of '4'. The value '4' of the reference number REF represents a location of a next control character C4 (i.e., sequentially next to the control character C1) in the first buffer 120.

In addition, since the control character C4 indicated by the reference number REF of the internal control character INC1 is not a sequentially last control character among the multiple control characters C1, C4, and C6 stored in the first buffer 120, the termination flag TF included in the internal control character INC4 may have a value of '0'.

The internal control character INC4 is generated by converting the control character C4. The mapping code MAP included in the internal control character INC4 may have a value corresponding to a value of the control character C4.

In addition, the reference number REF included in the internal control character INC4 may have a value of '6'. The value '6' of the reference number REF represents a location of a next control character C6 (i.e., sequentially next to the control character C4) in the first buffer 120.

In addition, since the control character C6 indicated by the reference number REF of the internal control character INC4 is a sequentially last control character among the multiple control characters C1, C4, and C6 stored in the first buffer 120, the termination flag TF included in the internal control character INC4 may have a value of '1'.

The internal control character INC6 is generated by converting the control character C6. Similar to the examples of INC1 and INC4 described above, the mapping code MAP included in the internal control character INC6 may have a value corresponding to a value of the control character C6.

In addition, since the control character C6 corresponding to the internal control character INC6 is the sequentially last control character among the multiple control characters C1, C4, and C6 stored in the first buffer 120, the reference number REF included in the internal control character INC6 may have a value of '1'. The value '1' of reference number REF represents a location of a sequentially first control character C1 among the multiple control characters C1, C4, and C6 stored in the first buffer 120.

In addition, since the control character C1 indicated by the reference number REF of the internal control character INC6 is not a sequentially last control character among the multiple control characters C1, C4, and C6 stored in the first buffer 120, the termination flag TF included in the internal control character INC4 may have a value of '0'.

As illustrated in FIG. 9, when the multiple control characters C1, C4, and C6 are stored in the first buffer 120, the encoding engine 110 may put the internal control character INC6 in the second type data block D_BLOCK2 as a first character of the second type data block D_BLOCK2. The internal control character INC6 is generated by converting the sequentially last control character C6 among the multiple control characters C1, C4, and C6 stored in the first buffer 120.

After that, the encoding engine 110 may generate the second type data block D_BLOCK2 by putting the data characters D0, D2, D3, D5, and D7 stored in the first buffer 120 and the multiple internal control characters INC1 and INC4 after the internal control character INC6 while maintaining an order of the characters stored in the first buffer 120. The internal control characters INC1 and INC4 are substituted for the multiple control characters C1 and C4.

The encoding engine 110 may omit the identification codes IC stored in the first buffer 120, and put the internal control characters INC1, INC4, and INC6 and the data characters D0, D2, D3, D5, and D7 in the second type data block D_BLOCK2.

Therefore, a size of the second type data block D_BLOCK2 may correspond to a sum of a size of the predetermined number of characters and a size of the block type code BTC.

As described above with reference to FIGS. 1 to 9, since the first type data block D_BLOCK1 and the second type data block D_BLOCK2 generated by the encoding device 100 do not include the identification codes IC included in the data sequence DS, an effective bandwidth of a communication channel between the first semiconductor chip 20 and the second semiconductor chip 30 may be increased.

In addition, the first character of the second type data block D_BLOCK2 may be the internal control character INC. A combination of the reference numbers REF included in the internal control characters INC of the second type data block D_BLOCK2 may correspond to a linked list representing the location of the at least one control character CC in the first buffer 120. Therefore, as will be described later, the decoding device 200 may determine whether each character included in the second type data block D_BLOCK2 is the data character DC or the control character CC, although the identification codes IC are not included in the second type data block D_BLOCK2.

Figure 10:
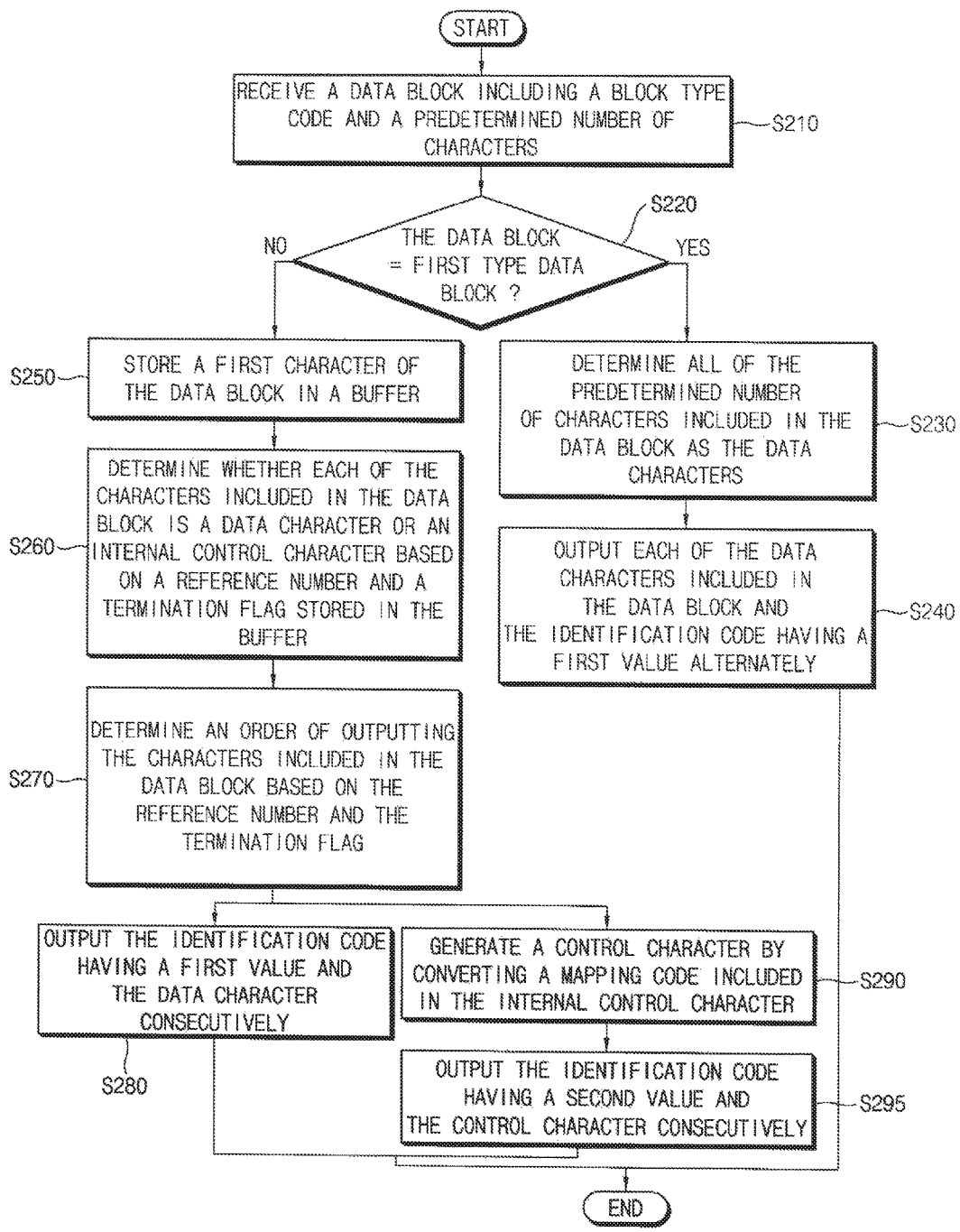
FIG. 10 is a flow chart illustrating a data decoding method for a communication between semiconductor chips according to example embodiments.

FIG. 10 is a flow chart illustrating a data decoding method for a communication between semiconductor chips according to example embodiments.

The data decoding method of FIG. 10 may be performed by the decoding device 200 of FIG. 1.

Hereinafter, a data decoding method performed by the decoding device 200 will be described with reference to FIGS. 1 to 10.

Referring to FIG. 10, the decoding engine 210 may receive the data block from the first semiconductor chip 20 (step S210. The data block includes the block type code BTC and the predetermined number of characters.

The decoding engine 210 may determine whether the data block is the first type data block D_BLOCK1 or the second type data block D_BLOCK2 based on the block type code BTC included in the data block (step S220).

Figure 11:
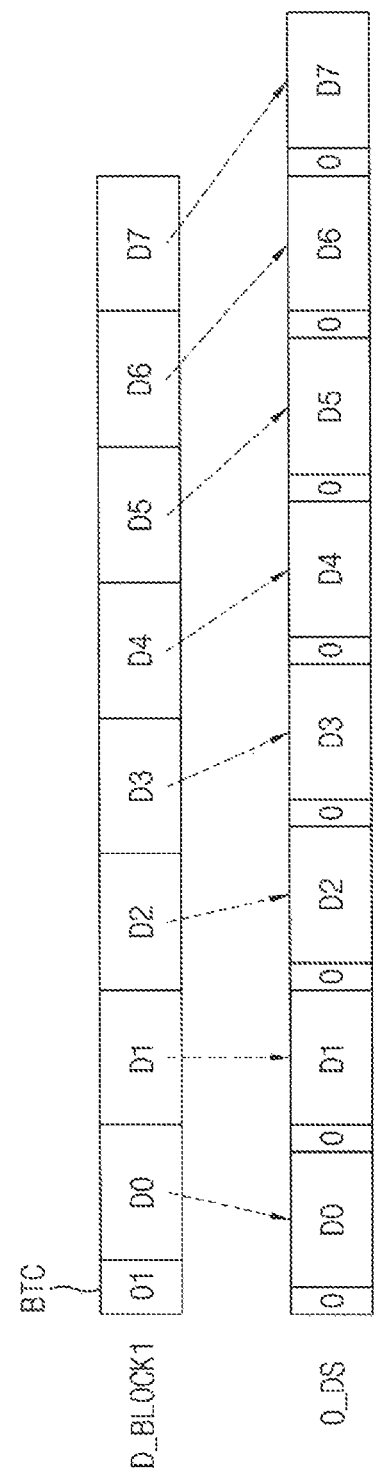
FIG. 11 is a diagram illustrating an example of an operation of a decoding device included in a second semiconductor chip of FIG. 1 when the decoding device receives the first type data block from the first semiconductor chip.

FIG. 11 is a diagram illustrating an example of an operation of a decoding device 200 included in a second semiconductor chip 30 of FIG. 1, when the decoding device 200 receives the first type data block from the first semiconductor chip 20.

Referring to FIG. 11, when the data block provided to the decoding engine 210 is the first type data block D_BLOCK1, the decoding engine 210 may determine that all of the predetermined number of characters included in the first type data block D_BLOCK1 are the data characters DC (step S230).

Therefore, as illustrated in FIG. 11, the decoding engine 210 may output each of the data characters DC included in the first type data block D_BLOCK1 and the identification code IC having the first value (e.g., '0' in FIG. 11) alternately as the output data sequence O_DS (step S240). An order of the data characters DC included in the output data sequence O_DS may be the same as an order of the data characters DC included in the first type data block D_BLOCK1.

Referring again to FIG. 10, when the data block provided to the decoding engine 210 is the second type data block D_BLOCK2, the decoding engine 210 may store a first character of the second type data block D_BLOCK2 in the second buffer 220 (step S250).

As described above with reference to FIGS. 1 to 9, the first character of the second type data block D_BLOCK2 may be the internal control character INC. In embodiments of FIGS. 13 and 14 described below, the first character of the second type data block D_BLOCK2 will be an internal control character INC.

Therefore, the decoding engine 210 may store the mapping code MAP, the reference number REF, and the termination flag TF included in the first character of the second type data block D_BLOCK2 in the second buffer 220.

Figure 12:
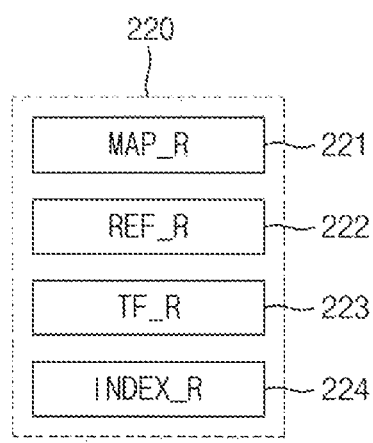
FIG. 12 is a diagram illustrating an example of a second buffer included in the second semiconductor chip of FIG. 1.

FIG. 12 is a diagram illustrating an example of a second buffer 220 included in the second semiconductor chip 30 of FIG. 1.

Referring to FIG. 12, the second buffer 220 may include a first register MAP_R 221, a second register REF_R 222, a third register TF_R 223, and a fourth register INDEX_R 224.

The decoding engine 210 may store the mapping code MAP, the reference number REF, and the termination flag TF included in the first character of the second type data block D_BLOCK2 in the first register 221, the second register 222, and the third register 223, respectively.

Referring again to FIG. 10, the decoding engine 210 may determine whether each of the characters included in the second type data block D_BLOCK2 is the data character DC or the internal control character INC (S260). The determination at S260 is based on the reference number REF stored in the second register 222 and the termination flag TF stored in the third register 223. The decoding engine 210 may determine an order of outputting the characters included in the second type data block D_BLOCK2 based on the reference number REF and the termination flag TF included in the at least one internal control character INC of the second type data block D_BLOCK2 (step S270). As explained herein, when the second type data block D_BLOCK2 has only one internal control character INC as in FIG. 13 explained below, the reference number REF and the termination flag TF may be included in the first character of the second type data block D_Block2. As a result, the first character of the second type data block is analogous to (e.g., corresponds to) the internal control character INC. When the second type data block D_BLOCK2 has several internal control characters as in FIG. 14 explained below, the first INC character (INC6 in FIG. 14) may include the initial reference number REF and initial termination flag TF values of the first character of the second type data block D_Block2 stored in the buffer 220. However, the reference number REF and termination flag TF in the buffer 220 may be updated using additional information from subsequent characters in the second type data block D_Block2. This updating is explained below with respect to FIG. 14.

Figure 13:
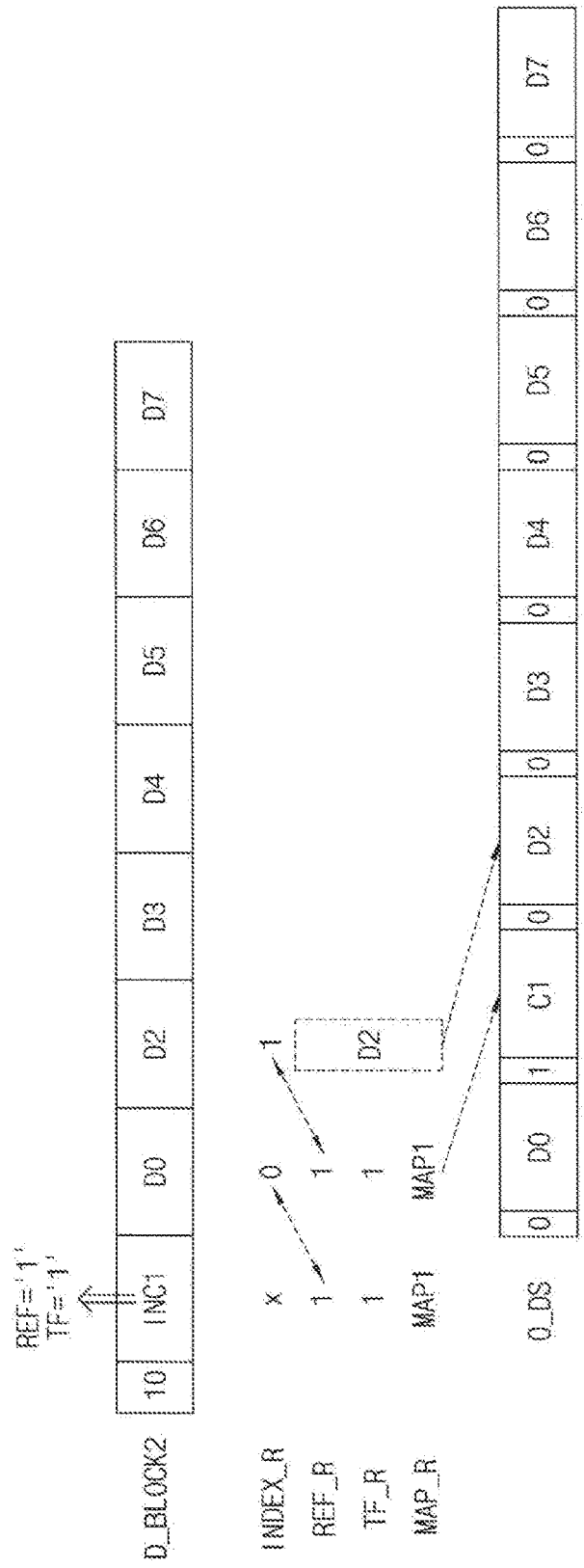
FIG. 13 is a diagram illustrating an example of an operation of a decoding device included in a second semiconductor chip of FIG. 1 when the decoding device receives the second type data block from the first semiconductor chip.

FIG. 13 is a diagram illustrating an example of an operation of a decoding device included in a second semiconductor chip of FIG. 1 when the decoding device receives the second type data block from the first semiconductor chip.

In FIG. 13, an operation of the decoding device 200 is illustrated when the second type data block D_BLOCK2 includes only one internal control character INC1.

As described above, when the second type data block D_BLOCK2 includes only one internal control character INC1, the one internal control character INC1 may correspond to a first character of the second type data block D_BLOCK2.

In FIG. 13, the mapping code MAP, the reference number REF, and the termination flag TF included in the internal control character INC1 are 'MAP1', '1', and '1', respectively, as an example.

As illustrated in FIG. 13, the decoding engine 210 may store the mapping code MAP, the reference number REF, and the termination flag TF included in the first character INC1 of the second type data block D_BLOCK2 in the first register MAP_R 221, the second register REF_R 222, and the third register TF_R 223, respectively.

The decoding engine 210 may store an index number in the fourth register INDEX_R 224.

When the decoding engine 210 receives a second character DO of the second type data block D_BLOCK2, the decoding engine 210 may initialize the index number stored in the fourth register INDEX_R 224 to '0'. After receiving the second character DO, whenever the decoding engine 210 receives the characters of the second type data block D_BLOCK2, the decoding engine 210 may consecutively increase the index number stored in the fourth register INDEX_R 224.

In addition, when the decoding engine 210 receives the second character DO of the second type data block D_BLOCK2, the decoding engine 210 may determine whether the index number stored in the fourth register INDEX_R 224 is the same as the reference number REF stored in the second register REF_R 222.

Since the index number stored in the fourth register INDEX_R 224 is '0' and the reference number REF stored in the second register REF_R 222 is '1', the index number stored in the fourth register INDEX_R 224 is different from the reference number REF stored in the second register REF_R 222. In this case, the decoding engine 210 may determine that the second character DO of the second type data block D_BLOCK2 is the data character DC. The decoding engine may output the identification code IC having the first value (e.g., '0' in FIG. 13) and the second character DO consecutively as the output data sequence O_DS (step S280).

When the decoding engine 210 receives a third character D2 of the second type data block D_BLOCK2, the decoding engine 210 may increase the index number stored in the fourth register INDEX_R 224 to '1'. The decoding engine 210 may determine whether the index number stored in the fourth register INDEX_R 224 is the same as the reference number REF stored in the second register REF_R 222.

Since the index number stored in the fourth register INDEX_R 224 is '1' and the reference number REF stored in the second register REF_R 222 is '1', the index number stored in the fourth register INDEX_R 224 is the same as the reference number REF stored in the second register REF_R 222. In this case, the decoding engine 210 may determine whether the termination flag TF stored in the third register TF_R 223 is '1'.

Since the termination flag TF stored in the third register TF_R 223 is '1', the decoding engine 210 may generate a control character C1 by converting the mapping code MAP stored in the first register MAP_R 221, which corresponds to 'MAP1' (step S290). After that, the decoding engine 210 may output the identification code IC having the second value (e.g., '1' in FIG. 13) and the control character C1 consecutively as the output data sequence O_DS (step S295).

In addition, the decoding engine 210 may store the third character D2 in the second buffer 220 at the same time as the decoding engine 210 outputs the control character C1.

After that, the decoding engine 210 may output the identification code IC having the first value (e.g., '0' in FIG. 13) and the third character D2 stored in the second buffer 220 consecutively as the output data sequence O_DS (step S280).

Since the control character C1, which corresponds to the termination flag TF having a value of '1', is output, all of the other characters remaining in the second type data block D_BLOCK2 may be the data characters DC.

Therefore, the decoding engine 210 may output the identification code IC having the first value (e.g., '0' in FIG. 13) and each of fourth through eighth characters D3, D4, D5, D6, and D7 included in the second type data block D_BLOCK2 alternately as the output data sequence O_DS.

Figure 14:
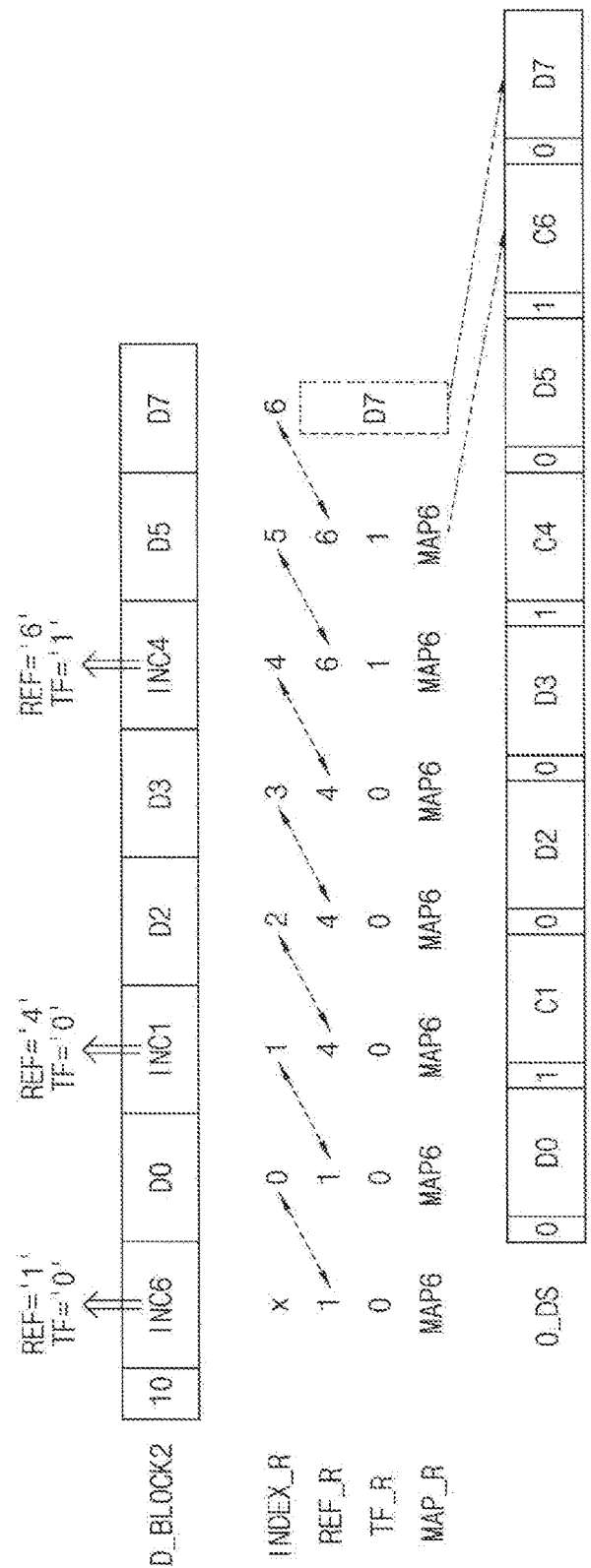
FIG. 14 is a diagram illustrating another example of an operation of a decoding device included in a second semiconductor chip of FIG. 1 when the decoding device receives the second type data block from the first semiconductor chip.

FIG. 14 is a diagram illustrating another example of an operation of a decoding device included in a second semiconductor chip of FIG. 1 when the decoding device receives the second type data block from the first semiconductor chip.

In FIG. 14, an operation of the decoding device 200 is illustrated when the second type data block D_BLOCK2 includes multiple internal control characters INC1, INC4, and INC6.

As illustrated in FIG. 14, the decoding engine 210 may store the mapping code MAP, the reference number REF, and the termination flag TF included in the first character INC6 of the second type data block D_BLOCK2 in the first register MAP_R 221, the second register REF_R 222, and the third register TF_R 223, respectively.

The decoding engine 210 may store an index number in the fourth register INDEX_R 224.

When the decoding engine 210 receives a second character DO of the second type data block D_BLOCK2, the decoding engine 210 may initialize the index number stored in the fourth register INDEX_R 224 to '0'. After receiving the second character DO, whenever the decoding engine 210 receives the characters of the second type data block D_BLOCK2, the decoding engine 210 may consecutively increase the index number stored in the fourth register INDEX_R 224.

In addition, when the decoding engine 210 receives the second character DO of the second type data block D_BLOCK2, the decoding engine 210 may determine whether the index number stored in the fourth register INDEX_R 224 is the same as the reference number REF stored in the second register REF_R 222.

Since the index number stored in the fourth register INDEX_R 224 is '0' and the reference number REF stored in the second register REF_R 222 is '1', the index number stored in the fourth register INDEX_R 224 is different from the reference number REF stored in the second register REF_R 222. In this case, the decoding engine 210 may determine that the second character DO of the second type data block D_BLOCK2 is the data character DC. The decoding engine 210 may output the identification code IC having the first value (e.g., '0' in FIG. 14) and the second character DO consecutively as the output data sequence O_DS (step S280).

When the decoding engine 210 receives a third character INC1 of the second type data block D_BLOCK2, the decoding engine 210 may increase the index number stored in the fourth register INDEX_R 224 to '1'. The decoding engine may determine whether the index number stored in the fourth register INDEX_R 224 is the same as the reference number REF stored in the second register REF_R 222.

Since the index number stored in the fourth register INDEX_R 224 is '1' and the reference number REF stored in the second register REF_R 222 is '1', the index number stored in the fourth register INDEX_R 224 is the same as the reference number REF stored in the second register REF_R 222. In this case, the decoding engine 210 may determine whether the termination flag TF stored in the third register TF_R 223 is '1'.

Since the termination flag TF stored in the third register TF_R 223 is '0', the decoding engine 210 may update the second register REF_R 222 and the third register TF_R 223 with the reference number REF and the termination flag TF included in the third character INC1, respectively. In addition, the decoding engine 210 may generate a control character C1 by converting the mapping code MAP included in the third character INC1 (step S290). After that, the decoding engine 210 may output the identification code IC having the second value (e.g., '1' in FIG. 14) and the control character C1 consecutively as the output data sequence O_DS (step S295).

When the index number stored in the fourth register INDEX_R 224 is different from the reference number REF stored in the second register REF_R 222, the received character may correspond to the data character DC. Therefore, the decoding engine 210 may output the identification code IC having the first value (e.g., '0' in FIG. 14) and the data character DC consecutively as the output data sequence O_DS.

Since the index number stored in the fourth register INDEX_R 224 is the same as the reference number REF stored in the second register REF_R 222 when the index number stored in the fourth register INDEX_R 224 becomes '4', the decoding engine 210 may update the second register REF_R 222 and the third register TF_R 223 with the reference number REF and the termination flag TF included in the character INC4, respectively. The character INC4 is received when the index number stored in the fourth register INDEX_R 224 is the same as the reference number REF stored in the second register REF_R 222. In addition, the decoding engine 210 may generate a control character C4 by converting the mapping code MAP stored in the character INC4 (step S290). After that, the decoding engine 210 may output the identification code IC having the second value (e.g., '1' in FIG. 14) and the control character C4 consecutively as the output data sequence O_DS (step S295).

After that, when the index number stored in the fourth register INDEX_R 224 becomes '6', the index number stored in the fourth register INDEX_R 224 may be the same as the reference number REF stored in the second register REF_R 222. Since the termination flag TF is '1' at this time, the decoding engine 210 may generate a control character C6 by converting the mapping code MAP stored in the first register MAP_R 221, which corresponds to 'MAP6' (step S290). After that, the decoding engine 210 may output the identification code IC having the second value (e.g., '1' in FIG. 14) and the control character C6 consecutively as the output data sequence O_DS (step S295).

In addition, the decoding engine 210 may store the character D7, which is received at this time, in the second buffer 220 at the same time as the decoding engine 210 outputs the control character C6.

After that, the decoding engine 210 may output the identification code IC having the first value (e.g., '0' in FIG. 14) and the character D7 stored in the second buffer 220 consecutively as the output data sequence O_DS (step S280).

As described above with reference to FIGS. 1 to 14, although the identification codes IC are not included in the second type data block D_BLOCK2, the decoding device 200 may determine locations of the internal control characters INC and an output order of the characters included in the second type data block D_BLOCK2 using the linked list formed by the reference numbers REF included in the internal control characters INC of the second type data block D_BLOCK2.

Therefore, the output data sequence O_DS generated by the decoding device 200 may be the same as the data sequence DS provided to the encoding device 100.

Figure 15:
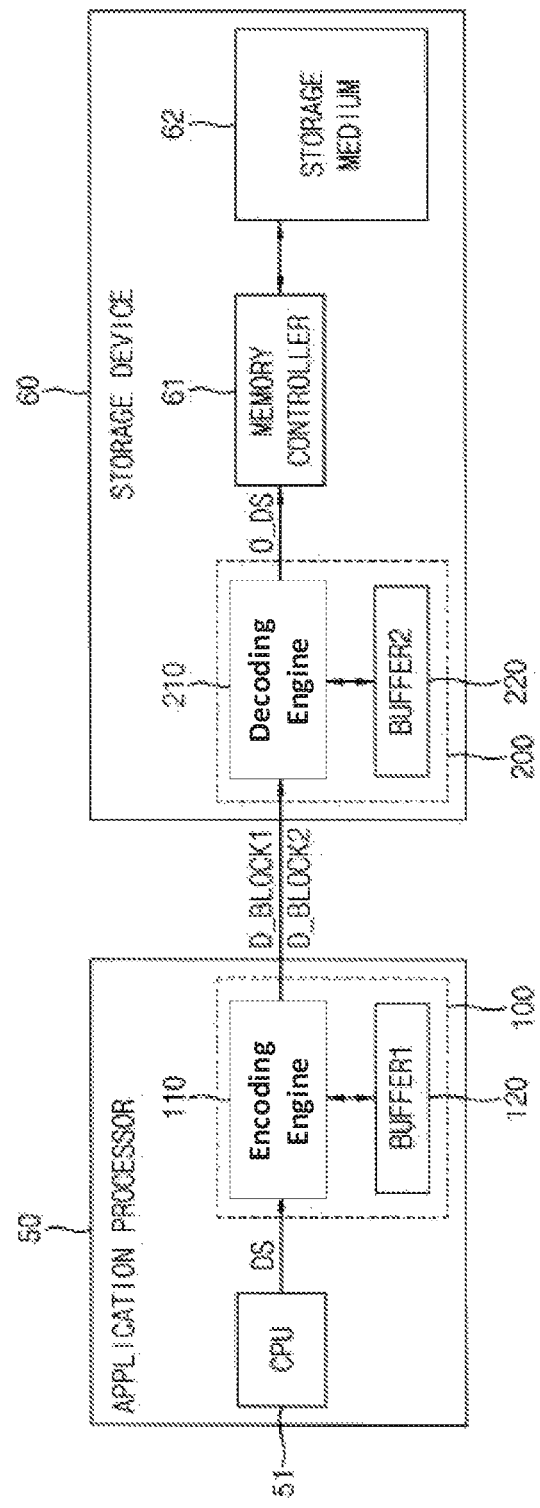
FIG. 15 is a block diagram illustrating an electronic device according to example embodiments.

FIG. 15 is a block diagram illustrating an electronic device according to example embodiments.

Referring to FIG. 15, an electronic device 40 includes an application processor 50 and a storage device 60.

The application processor 50 may include a central processing unit CPU 51 and an encoding device 100. The storage device 60 may include a decoding device 200, a memory controller 61, and a storage medium 62.

The encoding device 100 and the decoding device 200 included in the electronic device 40 of FIG. 15 may be the same as the encoding device 100 and the decoding device 200 included in the electronic device 10 of FIG. 1, respectively.

In some example embodiments, the storage device 60 may correspond to a universal flash storage (UFS), which operates according to a Mobile Industry Processor Interface (MIPI) standard.

In this case, the encoding device 100 and the decoding device 200 according to example embodiments may be used in the application processor 50 and the storage device 60, respectively, to increase an effective bandwidth of a communication channel between the application processor 50 and the storage device 60.

Although the encoding device 100 and the decoding device 200 are used in the UFS system as an example in FIG. 15, example embodiments of the present disclosure are not limited thereto. The encoding device 100 and the decoding device 200 according to example embodiments may be used in a data communication between any kinds of semiconductor chips.

The foregoing is illustrative of the inventive concept(s) described herein and is not to be construed as limiting thereof. Although a few example embodiments have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A data encoding method for a communication between semiconductor chips, the method comprising:
    receiving a data sequence including a plurality of characters and a plurality of identification codes coupled to the plurality of characters, respectively, each of the plurality of identification codes representing whether a corresponding character is a data character or a control character;
    storing the data sequence, in a buffer of a semiconductor chip that implements the data encoding method, in a unit of a predetermined number of pairs of characters and identification codes;
    determining whether at least one control character is stored in the buffer based on the identification codes stored in the buffer;
    converting, when at least one control character is stored in the buffer, the at least one control character to at least one internal control character, respectively, wherein when a plurality of control characters are stored in the buffer, at least one of a plurality of internal control characters corresponding to the plurality of control characters includes a reference number representing a location of a sequentially next control character in the buffer; and
    generating, by an encoding engine of an encoding device when at least one control character is stored in the buffer, and based on the at least one control character being stored in the buffer, a first type data block including data characters stored in the buffer and the at least one internal control character corresponding to the at least one control character stored in the buffer.

2. The method of claim 1, wherein a reference number included in an internal control character corresponding to a sequentially last control character stored in the buffer represents a location of a sequentially first control character stored in the buffer.

3. The method of claim 1, wherein each reference number included in the at least one internal control character included in the first type data block corresponds to a linked list representing a respective location of a corresponding at least one control character in the buffer.

4. The method of claim 1, wherein when only one control character is stored in the buffer, a first character of the first type data block corresponds to an internal control character, which corresponds to the only one control character stored in the buffer.

5. The method of claim 1, wherein when a plurality of control characters are stored in the buffer, a first character of the first type data block corresponds to an internal control character corresponding to a sequentially last control character stored in the buffer.

6. The method of claim 1, wherein an order of the data characters included in the first type data block is the same as an order of the data characters stored in the buffer.

7. The method of claim 1, wherein a size of the buffer corresponds to a sum of a size of the characters in the pairs and a size of the identification codes in the pairs.

8. The method of claim 1, wherein a number of bits of the data character, a number of bits of the control character, and a number of bits of the internal control character are the same.

9. The method of claim 1, wherein each internal control character of the at least one internal control characters further includes:

a mapping code representing a value of a control character respectively corresponding to the internal control character; and a termination flag representing whether the sequentially next control character stored in the buffer is a sequentially last control character stored in the buffer.

10. The method of claim 9, wherein when only one control character is stored in the buffer, a first character of the first type data block corresponds to an internal control character corresponding to the only one control character stored in the buffer, and the reference number included in the internal control character corresponding to the only one control character stored in the buffer represents a location of the only one control character in the buffer.

11. The method of claim 9, wherein when a plurality of control characters are stored in the buffer, a first character of the first type data block corresponds to an internal control character corresponding to a sequentially last control character stored in the buffer, and the termination flag included in an internal control character corresponding to a sequentially second from last control character stored in the buffer has a first value, and the termination flag included in each of internal control characters corresponding to all remaining control characters stored in the buffer has a second value different from a sequentially first value.

12. The method of claim 1, further comprising:

generating a second type data block including the data characters stored in the buffer when no control character is stored in the buffer.

13. The method of claim 12, wherein the first type data block further includes a block type code having a first value, and the second type data block further includes a block type code having a second value different from the first value.

14. The method of claim 13, wherein a size of the first type data block and a size of the second type data block correspond to a sum of a size of the characters in the pairs and a size of the block type codes.

15. A data decoding method for a communication between semiconductor chips, the method comprising:

receiving a data block including a block type code and a predetermined number of characters;

determining whether the data block is a first type data block or a second type data block based on the block type code;

when the data block is the first type data block:

storing a first character of the first type data block in a buffer of a semiconductor chip that implements the data decoding method;

determining whether each of the predetermined number of characters included in the first type data block is a data character or an internal control character based on a reference number and a termination flag stored in the buffer, wherein the reference number and the termination flag are initially included in the first character stored in the buffer;

determining an order of outputting the predetermined number of characters included in the first type data block based on the reference number and the termination flag;

outputting, when outputting the data character, an identification code having a first value and the data character consecutively; and generating, by a decoding engine of a decoding device when outputting the internal control character, a control character by converting a mapping code included in the internal control character, and then outputting an identification code having a second value and the control character consecutively.

16. The method of claim 15, wherein the first character of the first type data block comprises the internal control character or one of a plurality of internal control characters in the first type data block.

17. The method of claim 16, wherein each internal control character corresponds to a control character, respectively, and when outputting the control character, the reference number and the termination flag included in the internal control character are stored in the buffer to initially set or update the reference number and the termination flag stored in the buffer.

18. The method of claim 15, further comprising:

determining, when the data block is the second type data block, that all of the predetermined number of characters included in the second type data block are the data characters; and outputting each of the data characters included in the second type data block and the identification code having the first value alternately.

19. An encoding device, comprising:

a buffer of a semiconductor chip; and an encoding engine configured to perform a process comprising:

receiving a data sequence including a plurality of characters and a plurality of identification codes coupled to the plurality of characters, respectively, each of the plurality of identification codes representing whether a corresponding character is a data character or a control character;

storing the data sequence in the buffer in a unit of a predetermined number of pairs of characters and identification codes;

determining whether at least one control character is stored in the buffer based on the identification codes stored in the buffer;

converting, when at least one control character is stored in the buffer, the at least one control character to at least one internal control character, respectively, wherein when a plurality of control characters are stored in the buffer, at least one of a plurality of internal control characters corresponding to the plurality of control characters includes a reference number representing a location of a sequentially next control character in the buffer, and generating, when at least one control character is stored in the buffer, and based on the at least one control character being stored in the buffer, a first type data block including data characters stored in the buffer and the at least one internal control character corresponding to the at least one control character stored in the buffer.

20. The encoding device of claim 19, wherein the reference number included in the at least one internal control characters corresponds to a linked list representing the location of the at least one control character in the buffer.

* * * * *